United States Patent [19]

Östberg et al.

[11] 3,755,072
[45] Aug. 28, 1973

[54] STRAINER DEVICE FOR CELLULOSE DIGESTER

[75] Inventors: Bengt Sven Erik Östberg; Gustav Hilding Örtqvist, both of Karlstad, Sweden

[73] Assignee: Kamyr Aktiebolag, Karlstad, Sweden

[22] Filed: Oct. 23, 1970

[21] Appl. No.: 83,459

[52] U.S. Cl.............. 162/251, 162/237, 209/389, 210/357
[51] Int. Cl. ............................................ D21c 7/14
[58] Field of Search.................. 162/251, 248, 237, 162/41; 210/357, 415; 209/379, 384, 389

[56] References Cited
UNITED STATES PATENTS

| | | | |
|---|---|---|---|
| 3,159,572 | 12/1964 | Ranhagen | 210/415 X |
| 3,589,521 | 6/1971 | Richter | 162/251 X |
| 3,134,384 | 5/1964 | Rich | 162/237 X |

FOREIGN PATENTS OR APPLICATIONS

| | | | |
|---|---|---|---|
| 643,635 | 1937 | Germany | 209/379 |

*Primary Examiner*—S. Leon Bashore
*Assistant Examiner*—Alfred D'Andrea, Jr.
*Attorney*—Cushman, Darby & Cushman

[57] ABSTRACT

A strainer device for separating liquid from a suspension of fibrous material in a cellulose digester. The strainer plate consists of flat annular members separated by concentric slots. Rhombic shaped cleaning members attached to a rotary shaft move in the slots to keep them open and push back particles tending to clog them.

4 Claims, 4 Drawing Figures

Patented Aug. 28, 1973

3,755,072

2 Sheets-Sheet 2

INVENTORS
B.S.E. Östberg
G.H. Örtqvist

BY Cushman, Darby & Cushman
ATTORNEYS

STRAINER DEVICE FOR CELLULOSE DIGESTER

The invention relates to a strainer device adapted particularly for insertion in the shell of a cellulose digester and for withdrawing liquid from the digester, in the first place digesting liquor, but also washing liquid or similar. Clogging of strainers in continuous digesters is a drawback involving interruption of the operation for cleaning, and the invention aims at eliminating said drawback by making the strainers cleanable during operation.

According to the invention a plane circular strainer plate forming part of the strainer device is designed with concentric strainer slots in which rotary cleaning members are active.

Figure 1:
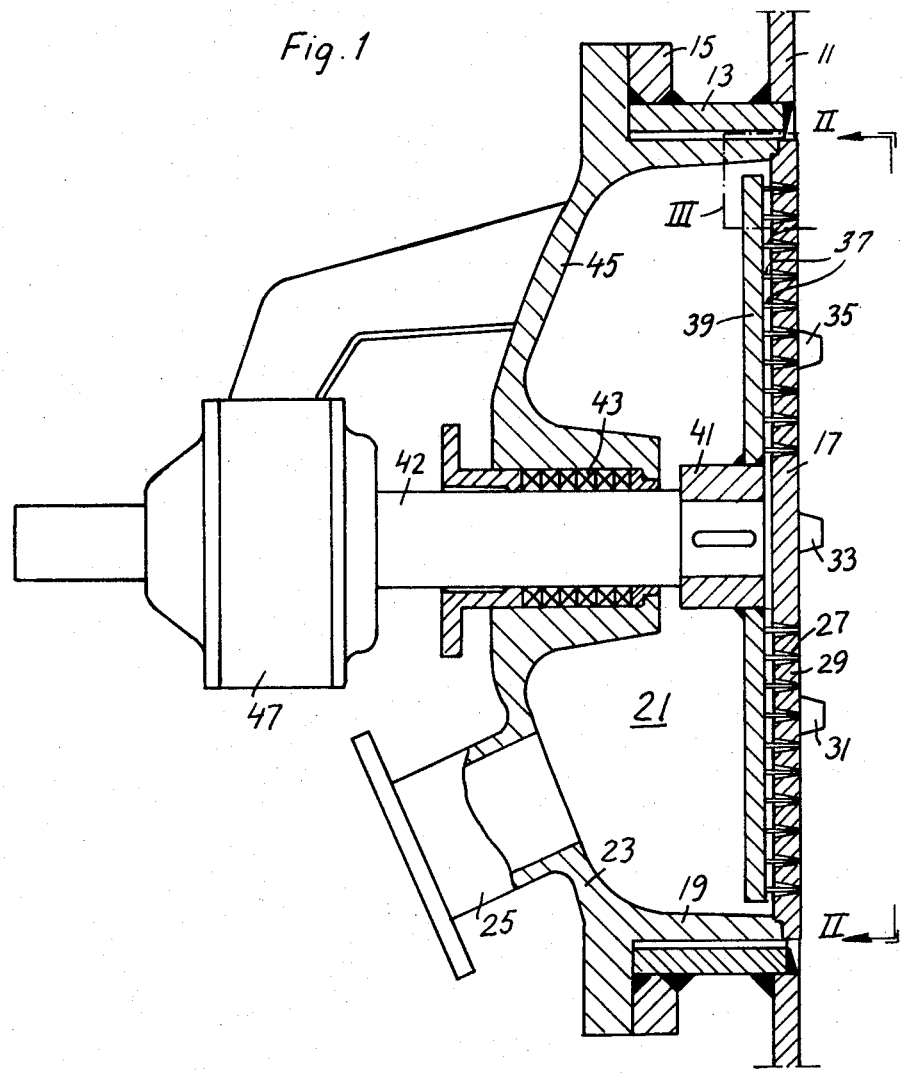
Figure 2:
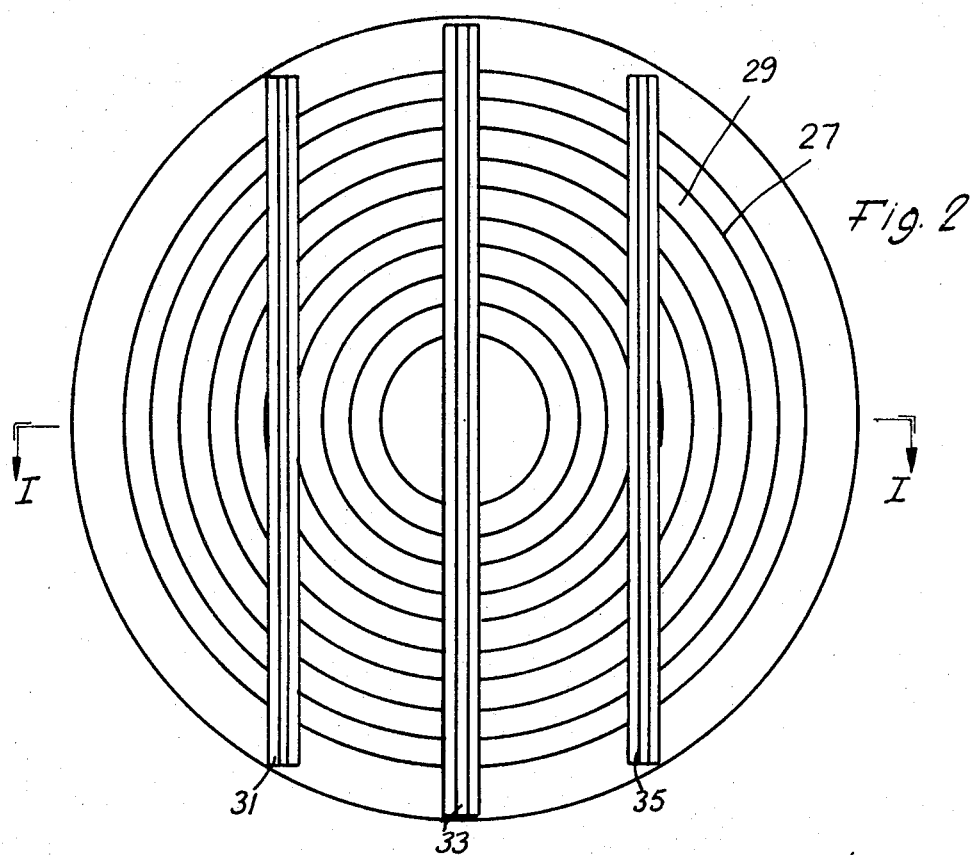
Figure 3:
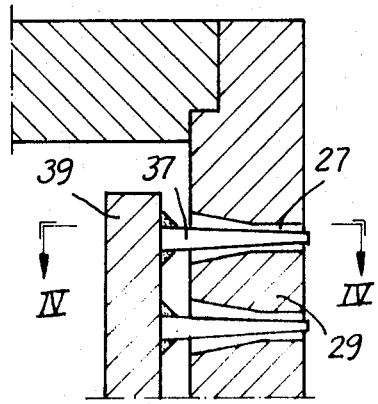
Figure 4:
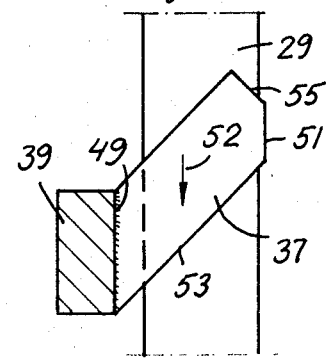

The invention will be more closely described herein below with reference to the accompanying drawings showing a preferred embodiment of the strainer device. FIG. 1 is a vertical cross-sectional view of the strainer device, and FIG. 2 is an elevational view thereof taken from the line II—II in FIG. 1. FIG. 3 shows the section III of FIG. 1 at an enlarged scale, and FIG. 4 is a partly sectional view of a detail taken from the line IV—IV in FIG. 3.

In FIG. 1, the strainer device is shown as being inserted in the shell 11 of a standing cylindrical digester. Welded to said shell outside of a circular aperture therein is a cylindrical sleeve 13 having a flange 15 to which the strainer device is fastened in a disengageable manner. The strainer device comprises a plane circular strainer plate 17, the edge of which rests against the cylindrical wall 19 of a filtrate collection chamber 21 located behind said plate and from which the filtrate passing the strainer plate is discharged through a tube connection flange 25 inserted in the back wall 23 of said chamber. In the strainer plate there is arranged a number of concentric strainer slots 27 dividing the strainer plate into separate annular members. These are held together on the front side by three straight, parallel beams 31, 33, 35 preferably having a trapezoidal cross-section and which cross the slots 27 so that each slot forms a complete circle without interruption. The strainer slots widen towards the backside of the strainer plate in order to facilitate that chips which have penetrated thereinto can be flushed out together with the liquid passing the strainer.

For the object of mechanical cleaning of the strainer slots there is arranged in the filtrate chamber 21 a cam-shaped cleaning mechanism comprising a series of aligned cleaning members 37 projecting from the backside into the strainer slots. The cleaning members 37 are attached to a beam 39 extending diametrically across the backside of the strainer plate and having its center attached by a hub 41 to a driving shaft 42. The latter extends through a stuffing box 43 at the center of the back wall 45 of the filtrate chamber and is journaled on the outside in a bearing 47.

The cleaning members are provided in a number twice as large as the number of strainer slots and each slot is cleaned during the turning of the shaft 42 by two diametrically opposite cleaning members. The cleaning members are formed of substantially rhombic plates which are set at an angle to the beam 39 and welded thereto along an edge 49. The cleaning plate 37 extends wholly through the strainer slot and preferably, its opposite edge 51 projects somewhat on the front side of the strainer plate, corresponding recesses being provided in the beams 31, 33, 35, so that there is no obstruction to the continuous movement of the cleaning members in one and the same direction of rotation. The side 53 of the cleaning plate leading in the motion (designated by the arrow 52) is inclined backwardly so that particles that have partially entered into the strainer slot and got stuck therein, are pushed back to the front side of the strainer plate and are carried forth with the fiber material continuously flowing along the same. At the corner 55 the cleaning plate is preferably beveled in order not to form any projecting point.

The cleaning mechanism is turned with a speed of rotation of preferably about half a revolution per minute. The cleaning members keep the slots free of fiber particles as well as deposits, such as incrusting materials. Particles too small for being returned to the digester by the cleaning members, are flushed into the chamber 21 and are discharged together with the liquid withdrawn by the strainer.

Although the described strainer device is intended in the first place for use in continuous cellulose digesters for withdrawing discharged or recirculated liquids, it can also be used for withdrawal of liquid from suspensions of cellulosic material in other apparatuses in cellulose mills.

What is claimed is:

1. A strainer device adapted for insertion in a shell portion of a cellulose digester, comprising:
    a plane circular strainer plate having a plurality of annular rings forming there between continuous concentric circular slots;
    rotary cleaning members continuously movable in each of said slots in one and the same direction, said rotary cleaning members have a substantially rhombic shape with one corner beveled, said beveled corner extending a relatively short distance through the slots past the front of said circular strainer plate, and said ribs having slots therein for providing clearance for the extending beveled corner;
    operating means including a rotary shaft located in a filtrate collection chamber rearward of the strainer plate, said strainer plate on its front side facing inwardly of the digester; and
    parallel ribs extending across the front of said strainer plate for maintaining connections between the annular rings of the strainer plate.

2. The strainer device as claimed in claim 1, in which the cleaning members project through the strainer slots and are formed with inclined faces for pushing back particles stuck in said slots.

3. The strainer device of claim 1 wherein said cleaner members have an incline away from the direction of motion so as to drive any solid particles stuck between any two adjacent rings out the front face of said strainer back into the digester and said cleaner members have a tapered shape in the direction of the slots which in turn have a similar taper broader from the inner face to the outer face of said strainer.

4. The strainer as claimed in claim 1 wherein said ribs have a substantially trapezoidal shape, the shorter base thereof extending into the digester and away from the front of the plate.

* * * * *

UNITED STATES PATENT OFFICE
CERTIFICATE OF CORRECTION

Patent No. 3,755,072    Dated August 28, 1973

Inventor(s) Bengt Sven Erik Ostberg et al

It is certified that error appears in the above-identified patent and that said Letters Patent are hereby corrected as shown below:

Claim 1, column 2, lines 40-42 of the patent, delete "and said ribs having slots....corner;"

line 49, after "plate" insert --, said ribs having slots therein for providing clearance for the extending beveled corner--.

Signed and sealed this 15th day of January 1974.

(SEAL)
Attest:

EDWARD M. FLETCHER, JR.
Attesting Officer

RENE D. TEGTMEYER
Acting Commissioner of Patents